United States Patent
Ono

(10) Patent No.: US 9,919,934 B2
(45) Date of Patent: Mar. 20, 2018

(54) WATER SOFTENING BALL

(71) Applicant: Etec Inc., Tokyo (JP)

(72) Inventor: Shiro Ono, Tokyo (JP)

(73) Assignee: Etec Inc., Tokyo (JP)

(*) Notice: Subject to any disclaimer, the term of this patent is extended or adjusted under 35 U.S.C. 154(b) by 96 days.

(21) Appl. No.: 15/089,538

(22) Filed: Apr. 2, 2016

(65) Prior Publication Data

US 2017/0197848 A1  Jul. 13, 2017

Related U.S. Application Data

(63) Continuation-in-part of application No. 14/990,193, filed on Jan. 7, 2016.

(51) Int. Cl.

| | |
|---|---|
| *C02F 1/42* | (2006.01) |
| *A01K 7/00* | (2006.01) |
| *A01K 29/00* | (2006.01) |
| *B01J 39/00* | (2006.01) |
| *C02F 103/20* | (2006.01) |

(52) U.S. Cl.
CPC .............. *C02F 1/42* (2013.01); *A01K 7/00* (2013.01); *A01K 29/00* (2013.01); *B01J 39/00* (2013.01); *C02F 2001/425* (2013.01); *C02F 2103/20* (2013.01)

(58) Field of Classification Search
None
See application file for complete search history.

(56) References Cited

U.S. PATENT DOCUMENTS

2017/0197846 A1* 7/2017 Ono .................. C02F 1/42

FOREIGN PATENT DOCUMENTS

JP  3143379 U  *  7/2008

OTHER PUBLICATIONS

Derwent Accession 2008-M21720, English Abstract of JP3143379U.*

* cited by examiner

*Primary Examiner* — Chester T Barry
(74) *Attorney, Agent, or Firm* — LambentIP

(57) ABSTRACT

A water softening ball for generating softened water by immersing it in water is provided, comprising a shell having a generally hollow ellipsoidal shape, wherein a plurality of openings are formed in the shell for the inside and the outside of the shell to communicate; and a filter unit included within the shell and comprising an ion exchange resin. The ellipsoidal shape includes a spherical shape.

26 Claims, 5 Drawing Sheets

WATER SOFTENING BALL

CROSS-REFERENCE TO RELATED APPLICATION

This application is a continuation-in-part of U.S. patent application Ser. No. 14/990,193, filed on Jan. 7, 2016, now abandonded.

BACKGROUND

Dogs, cats, and humans alike can suffer from urinary calculi or stones, a dreaded buildup of irritating substances in the urinary tract that causes pain and even obstruction. Urolithiasis refers to calcifications that form in the urinary system, primarily in the kidney (nephrolithiasis) or ureter (ureterolithiasis), and may also form in or migrate into the lower urinary system (bladder or urethra). The onset of these diseases is when the amount of minerals present in the urine is high enough that the minerals are unable to remain dissolved. Thus, prevention measures include proper diets to reduce the intake of such problem-causing minerals.

Water described as "hard" is high in dissolved minerals, specifically calcium and magnesium. Water supplied as tap water is hard or soft depending on regions, and mildly hard water is harmless to humans. However, calcium and magnesium content in generally supplied hard water can be too high for pets, whose bodies are smaller than humans, potentially leading to formation of urinary calculi or stones.

Systems and methods for water softening have been developed primarily for generating high-quality drinking water for humans. In particular, conventional technologies involve large scale systems to generate filtered water at the water source or complex devices including filter-regenerating functions. In view of the lack of developments targeted for use for dogs, cats and other small animals, this document provides a water softening device, which is portable, easy to handle and specifically tailored to generate soft water suitable for pets. Additionally, in this document, considerations are given for generating drinking water for people, who live in areas with hard water and wish to reduce mineral content in drinking water for health or other reasons.

DETAILED DESCRIPTION

Figure 1:
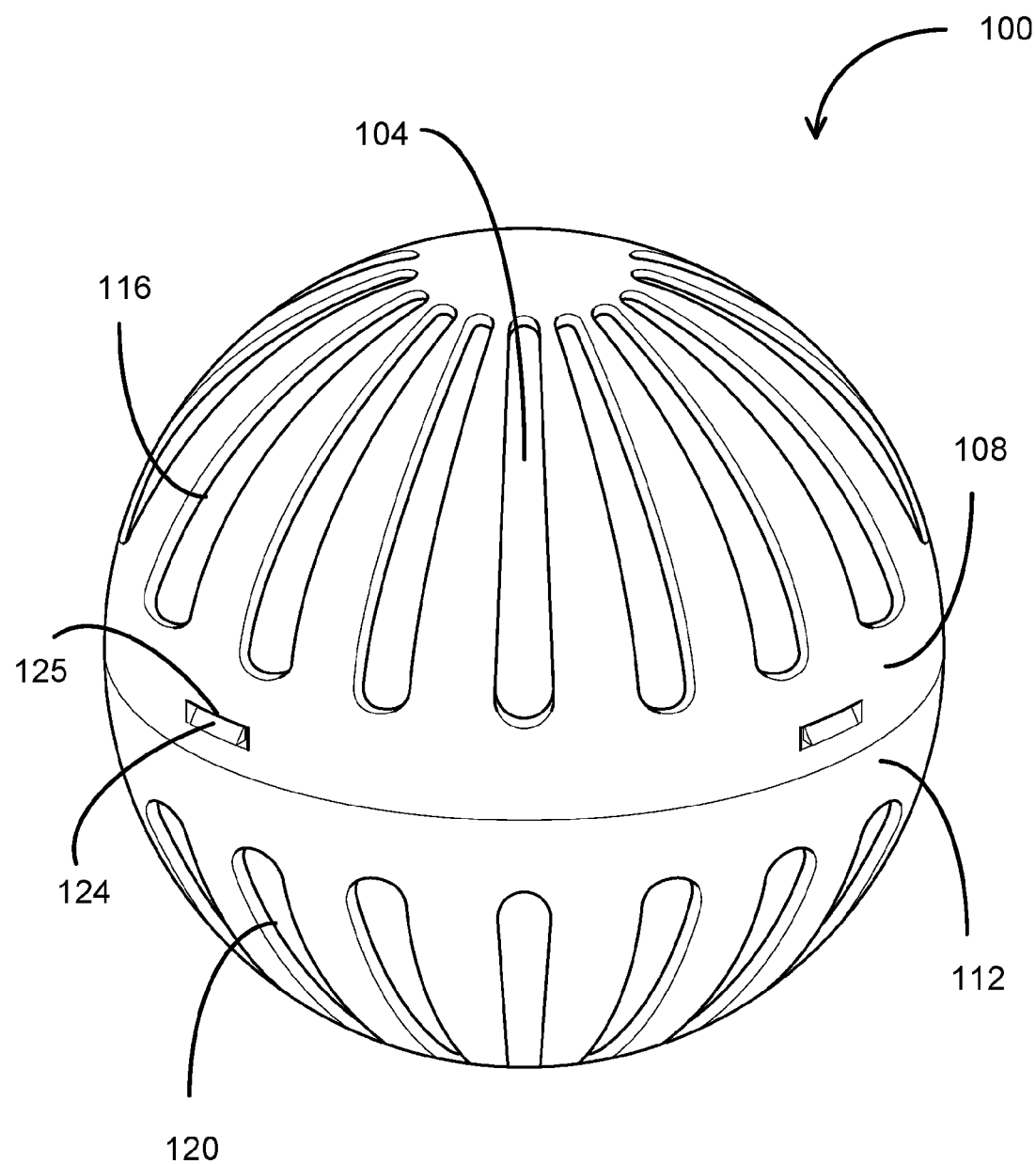
FIG. 1 illustrates a front perspective view of an example of a water softening ball according to an embodiment.

FIG. 1 illustrates a front perspective view of an example of a water softening ball according to an embodiment. In this example, the water softening ball 100 is illustrated to have a generally spherical shape; however, the shape can be ellipsoidal, elongated along a vertical axis or a horizontal axis. Generally, a n ellipsoid is defined by semi-principal axes of length a, b and c; and a sphere is a special case of an ellipsoid in which a=b=c. Thus, it should be understood by one of ordinary skill in the art that an ellipsoidal shape includes a spherical shape. The water softening ball 100 comprises a shell having a generally hollow ellipsoidal shape and a filter unit 104 included within the shell. The filter unit 104 comprises an ion exchange resin for softening water according to an embodiment. The shell comprises a first shell and a second shell coupled to each other. These first and second shells correspond to an upper shell 108 and a lower shell 112, respectively or vice versa, in the example illustrated in FIG. 1. A plurality of openings are formed in the shell, allowing the inside and outside of the shell to communicate. A first plurality of openings 116 are formed in the upper shell 108, and a second plurality of openings 120 are formed in the lower sell 112. The shape of each opening can be oval, rectangular, polygonal or other shape, and can be straight, bent, tapered, zig-zag, meshed or other form, as long as channeling of water between the inside and the outside of the shell is promoted through the openings.

Figure 2:
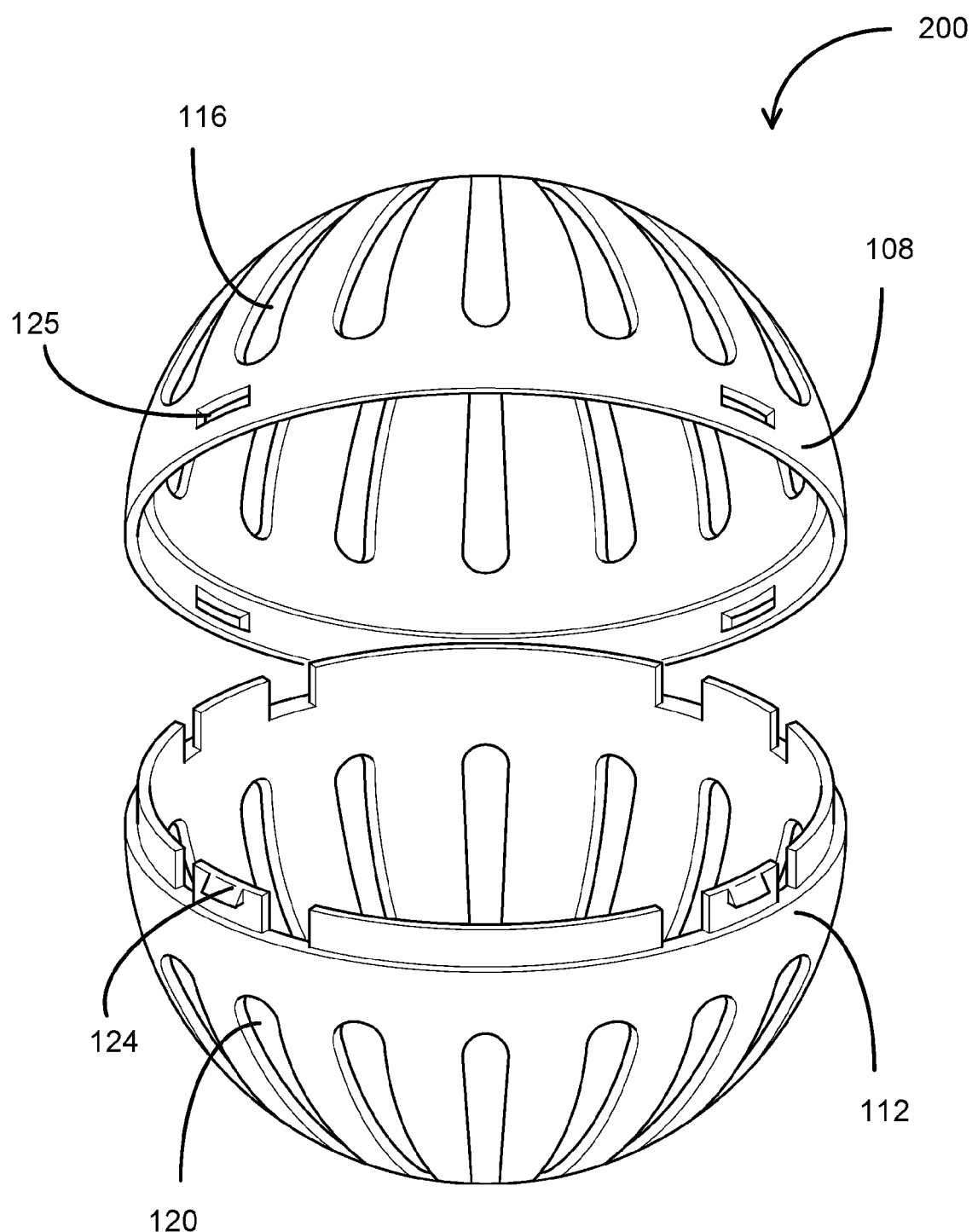
FIG. 2 illustrates a front perspective view of the shell when the upper and lower shells are detached from each other at substantially the equatorial circumference of the shell.

FIG. 2 illustrates a front perspective view of the shell 200 when the upper shell 108 and the lower shell 112 are detached from each other at substantially the equatorial circumference of the shell 200. The shell 200 may be made of a plastic, for example. Each of the upper and lower shells 108 and 112, i.e., the first and second shells, has a generally hollow semi-ellipsoidal shape in this example, having an opening defined by an elliptical edge. Here, an ellipse includes a circle, as an ellipsoid includes a sphere, as mentioned earlier. In this example, the volumes of the upper and lower shells 108 and 112 are illustrated to be substantially the same. Instead of at substantially the equatorial circumference of the shell 200, the upper and lower shells 108 and 112 may be configured to be attached to and detached from each other at an off-equatorial circumference of the shell 200. Thus, the volumes of the upper and lower shells 108 and 112 can be different, whereby each of the upper and lower shells 108 and 112 has a generally hollow partial ellipsoidal shape with an opening defined by an elliptical edge. For example, one of the upper and lowers shells 108 and 112 may be configured to be a small part of the whole shell 200, providing a small hole in the shell 200 when the part is detached.

The upper and lower shells 108 and 112 may be configured to be attached to and detached from each other by means of fasteners including hooks, screws, pins, latches and other engaging mechanism. In the example illustrated in FIGS. 1 and 2, a plurality of latching tabs 124 are formed at the elliptical edge portion of the lower shell 112, and a plurality of latching slits 125 are correspondingly formed at the elliptical edge portion of the upper shell 108, providing means for attaching and detaching the upper and lower shells 108 and 112 by engaging and disengaging, respectively, the latching tabs 124 and the corresponding latching slits 125. By using the engaging mechanism, the upper and lower shells 108 and 112 can be attached to and detached from each other, thereby enabling a user, a manufacturer, a retailer or any relevant person to replace the ion exchange resin inside the shell 200. Alternatively, the upper and lower shells 108 and 112 may be configured to be non-detachably attached to each other once the ion exchange resin is included within the shell 200. In this case, the replacement of the ion exchange resin is carried out by replacing the entire ball 100, and the used ball is disposed.

Figure 3:
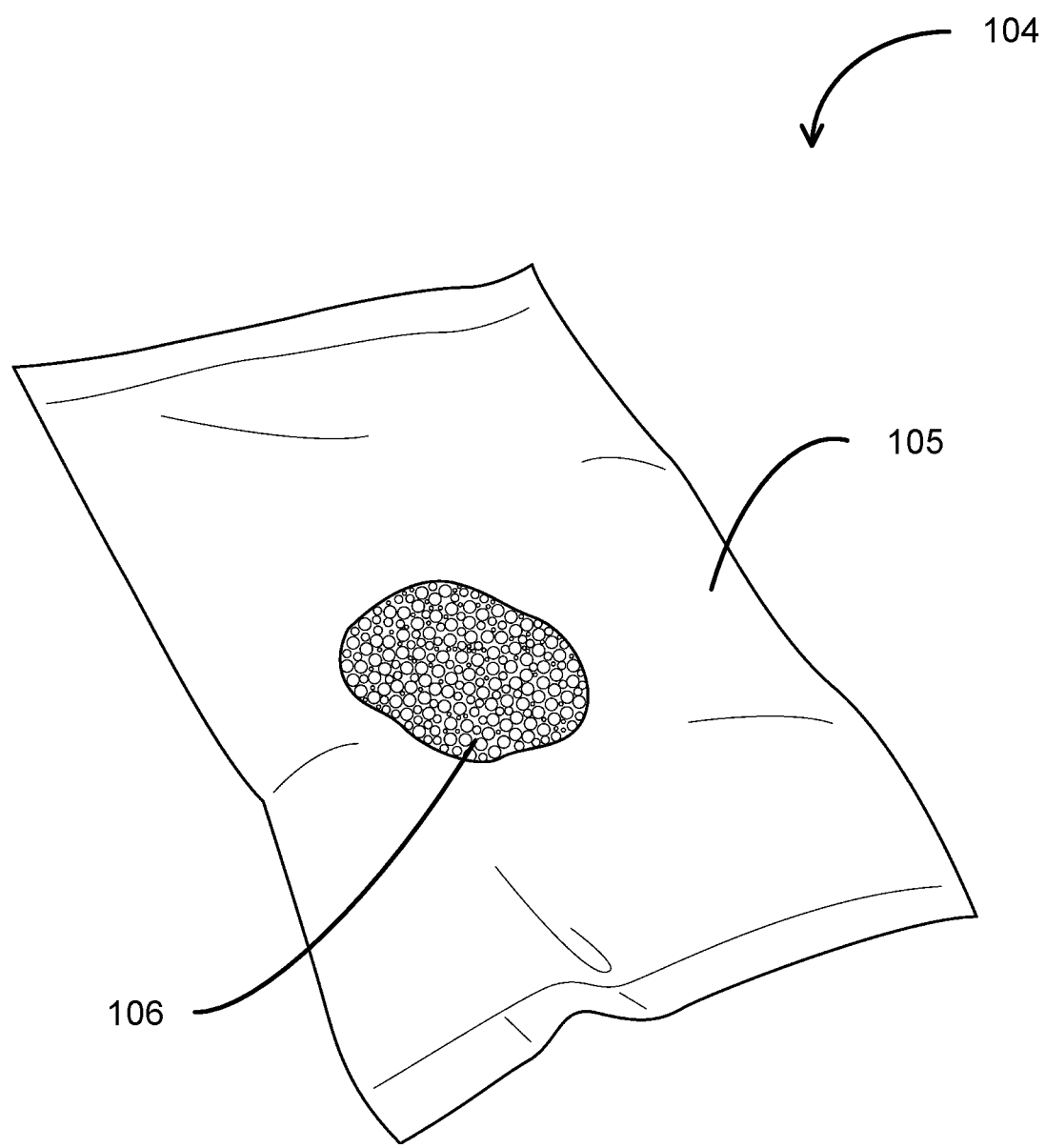
FIG. 3 illustrates an example of the filter unit.

FIG. 3 illustrates an example of the filter unit 104. The filter unit 104 comprises a bag 105 and an ion exchange resin 106 contained therein. The bag 105 may be made of a nonwoven fabric. In this figure, part of the bag 105 is illustrated to be transparent to show the content, which is the iron exchange resin 106 in the form of beads. Thus, the entire filter unit 104 is deformable to fit in an ellipsoidal, spherical, cuboidal or other shaped shell. In the case where the upper and lower shells 108 and 112 are configured to be detachably attached to each other, it is easy to replace the entire filter unit 104, comprising the bag 105 and the ion exchange resin 106 contained therein, to replace the ion exchange resin 106. The filter unit 104 so designed may be manufactured and sold separately as a refill, so that a user can dispose the used filter unit 104 and purchase only refills to put in the shell 200 for repetitively using the ball.

Figure 4:
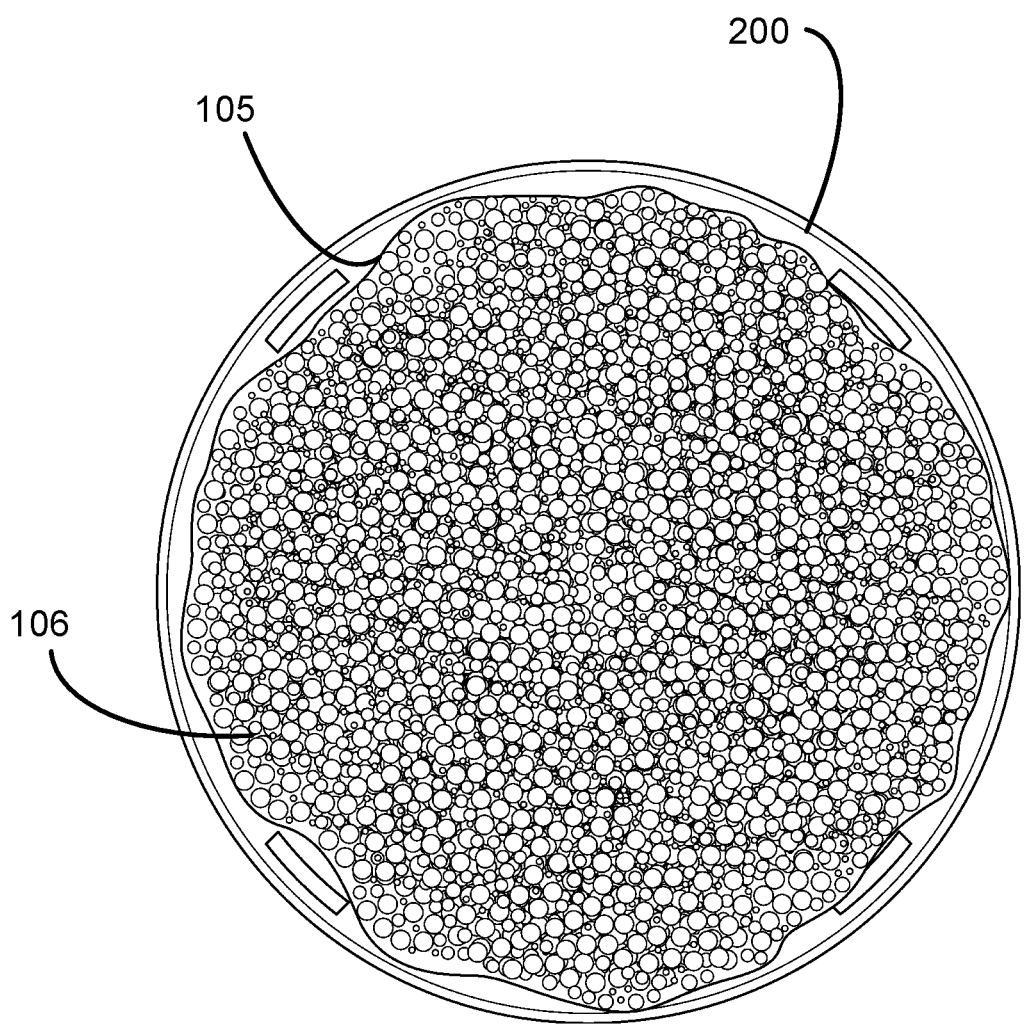
FIG. 4 illustrates a cross-sectional view of the example of the water softening ball, illustrated in FIG. 1, across the plane including the equatorial circumference of the shell.

FIG. 4 illustrates a cross-sectional view of the example of the water softening ball 100, illustrated in FIG. 1, across the plane including the equatorial circumference of the shell 200. The shell 200 contains the filter unit 104 comprising the bag 105 and the iron exchange resin 106 contained therein. The internal volume of the shell 200 is optimized to be stuffed with the entire filter unit 104, which contains a predetermined amount of the ion exchange resin 106.

Another example of the filter unit 104 may comprise a layer, instead of a bag 105, the layer having a generally hollow ellipsoidal shape configured to cover the internal surface of the generally hollow ellipsoidal shape of the shell 200, and an ion exchange resin in the form of beads contained within and enclosed by the layer. The layer may be made of a nonwoven fabric, and attached to the internal surface of the shell 200 by using an adhesive or other means. Accordingly, the layer, which is configured to cover the internal surface of the shell 200, encloses and contains the iron exchange resin 106 in the form of beads. Part of the shell, together with the layer covering the internal surface thereof, may be configured to be detachably attached to the rest of the shell so that the part can be detached when the ion exchange resin needs to be replaced. Alternatively, the part of the shell, together with the layer covering the internal surface thereof, may be configured to be non-detachably attached to the rest of the shell once the ion exchange resin is included within the layer and hence within the shell in this case, the replacement of the ion exchange resin is carried out by replacing the entire ball, and the used ball is disposed.

Yet another example of the filter unit 104 may comprise an ion exchange resin in the form of beads without having a bag or a layer to contain the iron exchange resin within. In other words, the iron exchange resin beads are directly put in the shell 200. In this case, the dimensions of each of the openings 116 and 120 need to be configured to prevent any of the beads from leaking out. The diameter of a bead of a typical ion exchange resin nowadays is about 0.5 mm-1 mm. Thus, at least one dimension of each opening should be made less than 0.5 mm to prevent the leak. For example, the shell 200 may be configured to form a fine mesh with at least one dimension of each opening being less than 0.5 mm. Part of the meshed shell may be configured to be detachably attached to the rest of the shell so that the part can be detached when the ion exchange resin needs to be replaced. Alternatively, the part of the meshed shell may be configured to be non-detachably attached to the rest of the shell once the ion exchange resin is included within the shell. In this case, the replacement of the ion exchange resin is carried out by replacing the entire ball, and the used ball is disposed.

Ion exchange resins are typically polymers that are capable of exchanging particular ions within the polymer with ions in a solution that come in contact with them. In water softening applications, $Na^+$-based or $H^+$-based ion exchange resins are typically used to reduce the mineral content, in particular, the magnesium and calcium ions, found in hard water. For the case of a $Na^+$-based ion exchange resin, when the resin is fresh, it contains sodium ions at its active sites. As the water passes through the resin, the resin takes up magnesium and calcium ions to its active sites, and releases $Na^+$ ions in the water, thereby softening the water. The resin can be recharged by washing it with salt water. The similar ion exchange mechanism can be carried out by using a $H^+$-based ion exchange resin, except that a $H^+$-based ion exchange resin is typically not rechargeable. The ion exchange resin in the filter unit 104 may be $Na^+$-based or $H^+$-based. However, it is preferable to use a $H^+$-based ion exchange resin for drinking water for pets. This is because the released $Na^+$ ions in the water inevitably increases the $Na^+$ ion content, thereby making it less suitable for drinking water for a pet who has a smaller body in size than a human. By using a $H^+$-based ion exchange resin, $H^+$ ions get released in the water in exchange of the minerals including magnesium and calcium ions, $H^+$ ions are generally harmless even for a pet.

Figure 5:
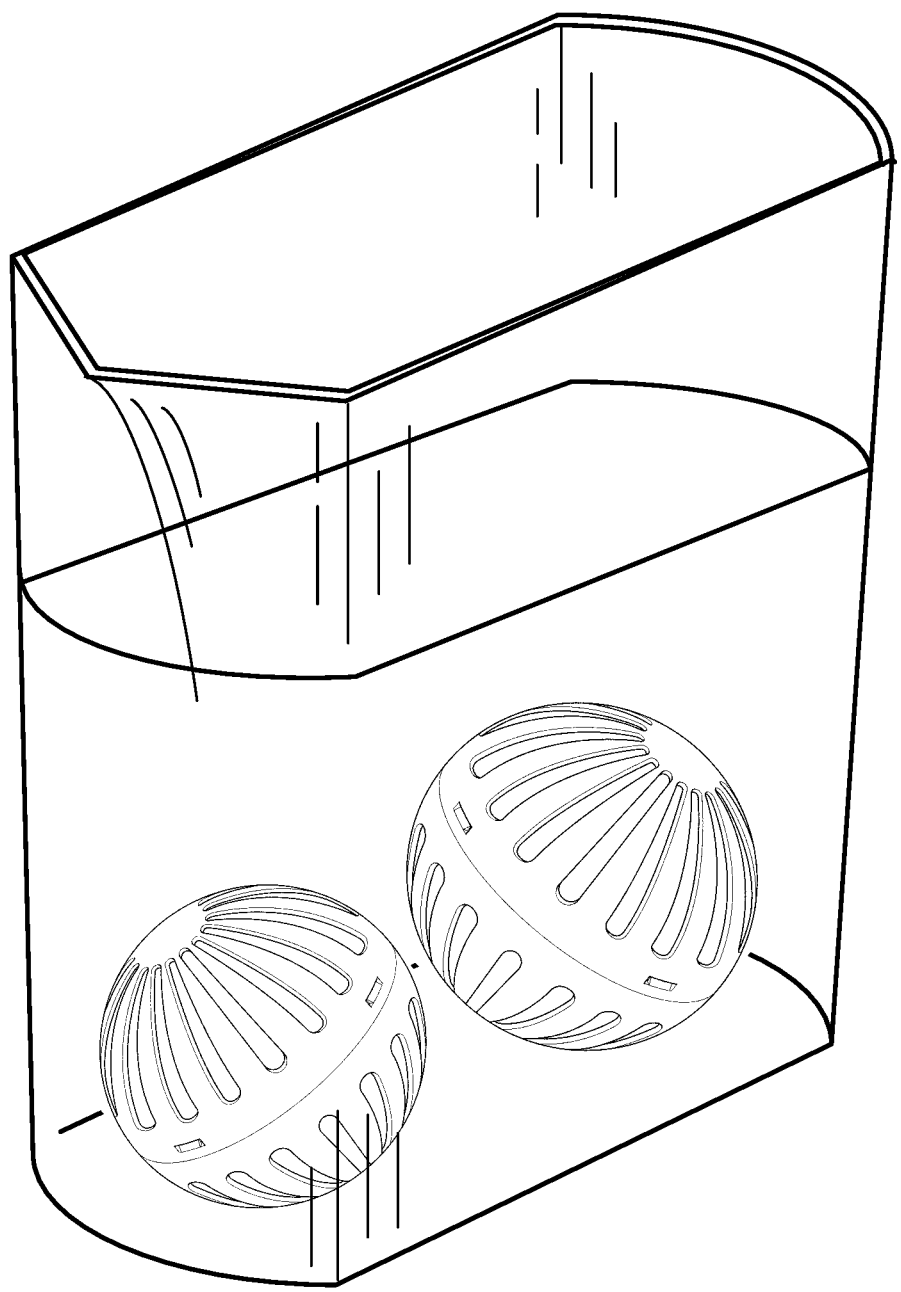
FIG. 5 illustrates an example configuration of the water softening ball immersed in water for generating softened water.

FIG. 5 illustrates an example configuration of the water softening ball 100 immersed in water for generating softened water. One or more balls can be immersed in original water, which may be tap water or already filtered and/or softened water to some degree. The water enters the ball 100 through the plurality of openings 116 and 120 formed in the shell 200, and then enters the filter unit 104, thereby contacting the ion exchange resin. 106 in the form of beads. The water that has contacted the ion exchange resin 106 can exit the shell 200 through the plurality of openings 116 and 120. The number of the balls can be adjusted depending on the level of water softening desired with respect to the water hardness of the original water and/or on the amount of water to be softened. In a region where the tap water hardness is high, two or more balls may be required. Alternatively, a commercially available water softening or filtering device may be used primarily, and the softened or filtered water may be further softened by adding one or more of the water softening ball 100 in the water.

It may be necessary to shake the container including the one or more balls 100 immersed in water to promote contacting of the water with the ion exchange resin 106 in the form of beads. In other words, by adjusting the frequency and/or the duration of shaking, it is possible for a user to control the water hardness level to generate water that is optimally softened and yet provides the original good taste and flavor.

Water hardness is a measure of the concentration of mineral content, in particular, $Ca^{2+}$ and $Mg^{2+}$ ions in water, which can be readily measured by using an off-the-shelf measurement device. In general, water hardness is expressed in various units, such as a molar concentration, ppm, mg/L, etc. The unit of mg/L is used herein, where L=liter=1000 $cm^3$. Water hardness of tap water differs from region to region; for example, it is about 30 in New York, 55 in San Francisco and in most areas of Japan, 90 in Los Angeles, 130 in Chicago, and 300 in Las Vegas and San Diego. The amount of ion exchange resin in the form of beads included in the present water softening ball can be predetermined in relation to the amount of water to be softened and the degree of softness to be achieved. Empirical relationships among relevant parameter values are explained below. Although specific numbers are cited herein to explain such relationships and metrics as examples, it should be understood that these are approximate values. The water softening rate, i.e., the hardness reduction, is 100% when the original water hardness of 50 is reduced to 0, and it is 50% when the original water hardness of 50 is reduced to 25. Obviously, there is a trade-off relationship between the amount of water that can be softened and the degree of hardness reduction. Table 1 below lists examples showing the relationships between the amount of water that can be softened and the degree of hardness reduction by using different amounts of the ion exchange resin.

TABLE 1

| Iron Exchange Resin (g) | Water Softened (L) | Hardness Reduction (Δ) | Hardness Reduction (Water Softening Rate, %) | Water Softened (L) × Hardness Reduction (Δ) | Number of Days with Drinking Rate of 0.5 L per Day |
|---|---|---|---|---|---|
| 100 | 100 | 50 → 0  | 100% | 5000 | 200 |
| 100 | 50  | 100 → 0 | 100% | 5000 | 100 |
| 100 | 60  | 100 → 20 | 80% | 5000 | 120 |
| 40  | 100 | 50 → 30 | 40% | 2000 | 200 |
| 40  | 80  | 50 → 25 | 50% | 2000 | 160 |
| 40  | 60  | 50 → 15 | 70% | 2000 | 120 |
| 40  | 50  | 50 → 10 | 80% | 2000 | 100 |
| 40  | 40  | 50 → 0  | 100% | 2000 | 80 |
| 40  | 40  | 100 → 50 | 50% | 2000 | 80 |
| 40  | 30  | 100 → 30 | 70% | 2000 | 60 |
| 40  | 25  | 100 → 20 | 80% | 2000 | 50 |
| 40  | 10  | 300 → 90 | 70% | 2000 | 20 |

As exemplified in Table 1, for the case of a typical ion exchange resin in the form of beads, 100 g of it can reduce the hardness of 100 L of water, which originally had the hardness of 50, to zero; and 100 g of it can reduce the hardness of 50 L of water, which originally had the hardness of 100, to zero. These are the cases for the water softening rate of 100%, By using 40 g of the ion exchange resin with the water softening rate of 100%, the hardness of 40 L of water, which originally had the hardness of 50, can be reduced to 0. By using 40 g of the ion exchange resin, 80 L of water can be softened with the water softening rate of 50% (reduction of the hardness from 50 to 25, for example). Similarly, by using 40 g of the ion exchange resin, about 60 L of water can be softened with the water softening rate of 70% (reduction of the hardness from 50 to 15, for example). Typically, a dog, a cat or other small animal needs about 0.5 L of water per day; thus, 60 L of the soft water (reduced from 50 to 15, for example) gets consumed after 120 days, and 80 L of the soft water (reduced from 50 to 25, for example) gets consumed after 160 days. The rightmost column in Table 1 lists the number of days it takes for the corresponding amount of softened water to be consumed, assuming that the pet drinks 0.5 L per day.

Various experiments suggested that excessive removal of the mineral content can degrade the taste and flavor of the water, and may even cause mineral deficiency. Thus, the hardness reduction, i.e., the water softening rate, should not be excessive, and yet the concentration of $Ca^{2+}$ and $Mg^{2+}$ ions should be reduced to a healthy level. Further experiments suggested that the concentration level of $Ca^{2+}$ and $Mg^{2+}$ ions, which can maintain a small animal healthy (e.g., preventing urinary calculi or stones) and yet keep the taste and flavor of the water, corresponds to the water hardness level in the range of 10-30. This range corresponds to the water softening rate of roughly 40-80% for the water with the original hardness of 50 by using 40 g of the ion exchange resin. The empirical relationships, shown, in bold face in Table 1, suggest that 40 g of the ion exchange resin can soften 50-100 L of water from the hardness level of 50 to the level in the range of 10-30, which lasts for 100-200 days, assuming that the pet drinks 0.5 L of the water per day. In the case when the water hardness level is reduced from 100 to 30, 40 g of the ion exchange resin can soften 30 L of water, which lasts for 60 days. Thus, the frequency of replacing or recharging the ion exchange resin is once in 2-7 months, which is a desirably long interval.

In the present water softening ball 100, the amount of ion exchange resin in the filter unit 104 and the volume of the shell 200 can be optimized for generating drinking water soft enough for a pet such as a dog, a cat and other small animal, and yet keeping the original taste and flavor. The volume of the shell 200 can be configured to be small enough to be put in a portable container or a pitcher with a capacity of water that can be handled with one hand. A small animal for a pet typically drinks about 0.5 L of water per day. Certain types of small cats drink even less, such as 0.2 L per day. Accordingly, the volume of the shell 200 is configured to be small enough to be put in a container having a capacity of at least the daily amount of drinking water for a pet. That is, the diameter or one dimension of the shell 200 may be in the range of 3 cm-6 cm, so that it can be easily accommodated in a container having a capacity in the range of 0.25 L-1.5 L. Here, a measure of the diameter is for the case wherein the shell 200 has a generally spherical shape, and a measure of the one dimension may be twice the length of one of the three semi-principal axes, i.e., 2a, 2b or 2c, for the case wherein the shell has a generally ellipsoidal shape. The shell 200 with the diameter or one dimension in the range of 3 cm-6 cm can contain the ion exchange resin in the range of 20 g-70 g. Therefore, the water softening ball 100 can be configured as above based on the optimization considerations to generate softened water for a pet, such as a cat, a dog and other small animal, wherein the water hardness can be lowered to a level in the range of 10-30.

It should be noted that in regions where the water hardness is high, for example, 120 or higher, it takes more resin to lower the hardness to a desired level, and/or the resin needs to be replaced or recharged frequently. For example, by using 40 g of the ion exchange resin, only 10 L of water can be softened from the hardness level of 300 to 90, as exemplified in Table 1, giving about 20 day supply of soft water for a pet. It should also be noted that the ion exchange resin itself may not be capable of drastically reducing the water hardness. In the above example, the hardness reduction from 300 to 90 corresponds to the softening rate of 70%, but the resultant water is still as hard as 90. This means, in a region having the water hardness of 300, such as Las Vegas or San Diego, even by using the ion exchange resin with the water softening rate of 80%, the resultant hardness is still 60, which is not suitable for a pet. Thus, one water softening ball 100 configured and optimized for a pet as above may be suitable for use in regions where the water hardness is less than 120. The water softening device disclosed in the commonly-owned U.S. patent application Ser. No. 14/990,081 may be suitable for use in such regions with high water hardness. Alternatively, in regions where the original water hardness is extremely high (e.g., 120 or higher) and/or in cases where a large amount of water needs to be softened, two or more balls can be used. Yet alternatively, one or more balls may be added to the water contained in the above mentioned water softening device to further reduce the water hardness, wherein the water can be water contained for processing or water contained after processing in the water softening device disclosed in the above-mentioned U.S. patent application.

The present water softening ball 100 can also be used to generate softened water for a human as well, in particular, for people living in an area with hard water who may wish to drink softened water for health or other reasons. In the earlier examples, the desired water hardness level is empirically determined to be in the range of 10-30 for a pet based on various experiments. Since a human body is relatively large and resilient to problem-causing minerals compared to a pet with a small body, it may be considered that the hardness level suitable for a human is about 100 or below, roughly equivalent to a level less than 110. Table 2 below lists examples showing the relationships between the amount of water that can be softened and the degree of hardness reduction by using different amounts of the ion exchange resin. In particular, these examples include cases of reducing the water hardness level to 100 or 60, for people who live in areas with extremely hard water, e.g., the hardness level of 120 or above.

TABLE 2

| Iron Exchange Resin (g) | Water Softened (L) | Hardness Reduction (Δ) | Hardness Reduction (Water Softening Rate, %) | Water Softened (L) × Hardness Reduction (Δ) | Number of Days with Drinking Rate of 2.0 L per Day |
|---|---|---|---|---|---|
| 100 | 100 | 150 → 100 | 30% | 5000 | 50 |
| 100 | 50  | 200 → 100 | 50% | 5000 | 25 |
| 100 | 25  | 300 → 100 | 70% | 5000 | 12.5 |
| 40  | 100 | 120 → 100 | 20% | 2000 | 50 |
| 40  | 40  | 150 → 100 | 30% | 2000 | 20 |
| 40  | 20  | 200 → 100 | 50% | 2000 | 10 |
| 40  | 13  | 250 → 100 | 60% | 2000 | 6.5 |
| 40  | 10  | 300 → 100 | 70% | 2000 | 5 |
| 40  | 33  | 120 → 60  | 50% | 2000 | 16.5 |
| 40  | 22  | 150 → 60  | 60% | 2000 | 11 |
| 40  | 14  | 200 → 60  | 70% | 2000 | 7 |

It can be seen from the above Table 2 that in an area with hard water at the 300 level, such as Las Vegas and San Diego, 40 g of the ion exchange resin can be used to soften 10 L of water from the hardness level of 300 to 100. 10 L of the softened water lasts for 5 days, assuming that a human drinks 2.0 L of the water per day. Similarly, to reduce the water hardness level from 300 to 100, 100 g of the ion exchange resin can be used to soften 25 L of water, which lasts for 12.5 days for a human. Thus, the frequency of replacing or recharging the ion exchange resin is relatively frequent compared to the case of generating softened water for a pet.

As mentioned earlier, when the diameter or one dimension of the shell 200 is in the range of 3 cm-6 cm, the corresponding amount of the ion exchange resin can be in the range of 20 g-70 g. It is preferable to keep the size of the water softening ball to this range even for generating softened water for a human, because such a relatively small-size ball can fit in a hand-held container or other-type of portable container, providing a user with easy handling. Furthermore, if the size of the ball is larger, the ion exchange resin beads around the center of the ball cannot be easily contacted by the penetrating water, even if the container having the ball immersed in the water is shaken.

As indicated in Table 2 above, 40 g of the ion exchange resin can be used to soften 10 L of water from the hardness level of 300 to 100, and 10 L of the softened water lasts for 5 days, assuming that a human drinks 2.0 L of the water per day. This means, in the case of using a $H^+$-based ion exchange resin for generating softened water for a human, it must be replaced frequently if the amount is kept in the range of 20 g-70 g in the ball with a diameter in the range of 3 cm-6 cm. Alternatively, two or more balls can be used in a large container to generate a correspondingly large amount of softened water. Yet alternatively, a $Na^+$-based ion exchange resin can be used for a human instead of a $H^+$-based ion exchange resin. As mentioned earlier, it is not desirable to use a $Na^+$-based ion exchange resin to generate softened water for a pet. This is because the released $Na^+$ ions in the water inevitably increases the $Na^+$ ion content, thereby making it less suitable for drinking water for a pet who has a small body. In contrast, use of a $Na^+$-based ion exchange resin is not considered to be problematic for a human, because the released $Na^+$ ion level is well within a tolerance for a human body. The $Na^+$-based ion exchange resin can be recharged by washing it with salt water, for example, by using 10% saline solution. Such saline solutions can be easily made by simply dissolving salt in water at home. Thus, the cost for acquiring the ion exchange resin over a long term can be significantly reduced by using the present water softening ball with a $Na^+$-based ion exchange resin therein for use for a human. For example, in an example of using 40 g of a $H^+$-based ion exchange resin to soften 10 L of water from the hardness level of 300 to 100, the resin needs to be replaced every 5 days; whereas, by using 40 g of a $Na^+$-based ion exchange resin, the resin only needs to be washed with salt water every 5 days for recharging for repetitive use, thereby reducing the cost. Therefore, the water softening ball 100 can be configured based on the optimization considerations to generate softened water for a human as well, wherein the water hardness can be lowered to a level that is less than 110.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be exercised from the combination, and the claimed combination may be directed to a subcombination or a variation of a subcombination.

What is claimed is:

1. A water softening ball for generating softened water by immersing it in water, the water softening ball comprising:
   a shell having a generally hollow ellipsoidal shape including a hollow spherical shape, wherein a plurality of openings are formed in the shell for an inside and an outside of the shell to communicate; and
   a filter unit included within the shell and comprising an ion exchange resin,
   wherein
   an amount of the ion exchange resin and a volume of the shell are configured to generate the softened water for a pet to have water hardness of the softened water in the range of 10 mg/L-30 mg/L, wherein the water hardness is a measure of a concentration of mineral content including $Ca^{2+}$ and $Mg^{2+}$ ions in water.

2. The water softening ball of claim 1, wherein the shell comprises a first shell and a second shell, each of which has a generally hollow partial ellipsoidal shape having an opening defined by an elliptical edge.

3. The water softening ball of claim 2, wherein
the first and second shells are detachably attached to each other based on an engaging mechanism.

4. The water softening ball of claim 3, wherein
the engaging mechanism is based on a plurality of latching tabs formed at the elliptical edge portion of the first shell and a plurality of latching slits correspondingly formed at the elliptical edge portion of the second shell.

5. The water softening ball of claim 2, wherein
the first and second shells are non-detachably attached to each other once the ion exchange resin is included within the shell.

6. The water softening ball of claim 1, wherein
the filter unit further comprises a bag made of a nonwoven fabric, which contains the ion exchange resin therein.

7. The water softening ball of claim 1, wherein
the filter unit further comprises a layer made of a nonwoven fabric and having a generally hollow ellipsoidal shape configured to cover an internal surface of the generally hollow ellipsoidal shape of the shell, the layer containing and enclosing the ion exchange resin.

8. The water softening ball of claim 1, wherein
the plurality of openings are formed in the shell to configure a meshed shell, wherein at least one dimension of each of the plurality of openings is configured to be smaller than a diameter of a bead of the ion exchange resin.

9. The water softening ball of claim 1, wherein
a diameter or one dimension of the shell is in the range of 3 cm-6 cm.

10. The water softening ball of claim 1, wherein
an amount of the ion exchange resin is in the range of 20 g-70 g.

11. The water softening ball of claim 1, wherein
the ion exchange resin is a $H^+$-based ion exchange resin or a $Na^+$-based ion exchange resin.

12. The water softening ball of claim 1, wherein
the ion exchange resin is a $H^+$-based ion exchange resin.

13. A method of generating softened water by using the water softening ball of claim 1, the method comprising:
immersing one or more water softening balls in water, wherein the number of the water softening balls is adjusted depending on water hardness, an amount of water to be softened, or both; and
shaking a container including the one or more water softening balls immersed in the water to promote contacting of the water with the ion exchange resin in a form of beads contained in the one or more water softening balls.

14. A water softening ball for generating softened water by immersing it in water, the water softening ball comprising:
a shell having a generally hollow ellipsoidal shape including a hollow spherical shape, wherein a plurality of openings are formed in the shell for an inside and an outside of the shell to communicate; and
a filter unit included within the shell and comprising an ion exchange resin,
wherein
an amount of the ion exchange resin and a volume of the shell are configured to generate the softened water for a human to have water hardness of the softened water to be less than 110 mg/L, wherein the water hardness is a measure of a concentration of mineral content including $Ca^{2+}$ and $Mg^{2+}$ ions in water.

15. The water softening ball of claim 14, wherein
the shell comprises a first shell and a second shell, each of which has a generally hollow partial ellipsoidal shape having an opening defined by an elliptical edge.

16. The water softening ball of claim 15, wherein
the first and second shells are detachably attached to each other based on an engaging mechanism.

17. The water softening ball of claim 16, wherein
the engaging mechanism is based on a plurality of latching tabs formed at the elliptical edge portion of the first shell and a plurality of latching slits correspondingly formed at the elliptical edge portion of the second shell.

18. The water softening ball of claim 15, wherein
the first and second shells are non-detachably attached to each other once the ion exchange resin is included within the shell.

19. The water softening ball of claim 14, wherein
the filter unit further comprises a bag made of a nonwoven fabric, which contains the ion exchange resin therein.

20. The water softening ball of claim 14, wherein
the filter unit further comprises a layer made of a nonwoven fabric and having a generally hollow ellipsoidal shape configured to cover an internal surface of the generally hollow ellipsoidal shape of the shell, the layer containing and enclosing the ion exchange resin.

21. The water softening ball of claim 14, wherein
the plurality of openings are formed in the shell to configure a meshed shell, wherein at least one dimension of each of the plurality of openings is configured to be smaller than a diameter of a bead of the ion exchange resin.

22. The water softening ball of claim 14, wherein
a diameter or one dimension of the shell is in the range of 3 cm-6 cm.

23. The water softening ball of claim 14, wherein
an amount of the ion exchange resin is in the range of 20 g-70 g.

24. The water softening ball of claim 14, wherein
the ion exchange resin is a $H^+$-based ion exchange resin or a $Na^+$-based ion exchange resin.

25. The water softening ball of claim 14, wherein
the ion exchange resin is a $Na^+$-based ion exchange resin.

26. A method of generating softened water by using the water softening ball of claim 14, the method comprising:
immersing one or more water softening balls in water, wherein the number of the water softening balls is adjusted depending on water hardness, an amount of water to be softened, or both; and
shaking a container including the one or more water softening balls immersed in the water to promote contacting of the water with the ion exchange resin in a form of beads contained in the one or more water softening balls.

* * * * *